UNITED STATES PATENT OFFICE.

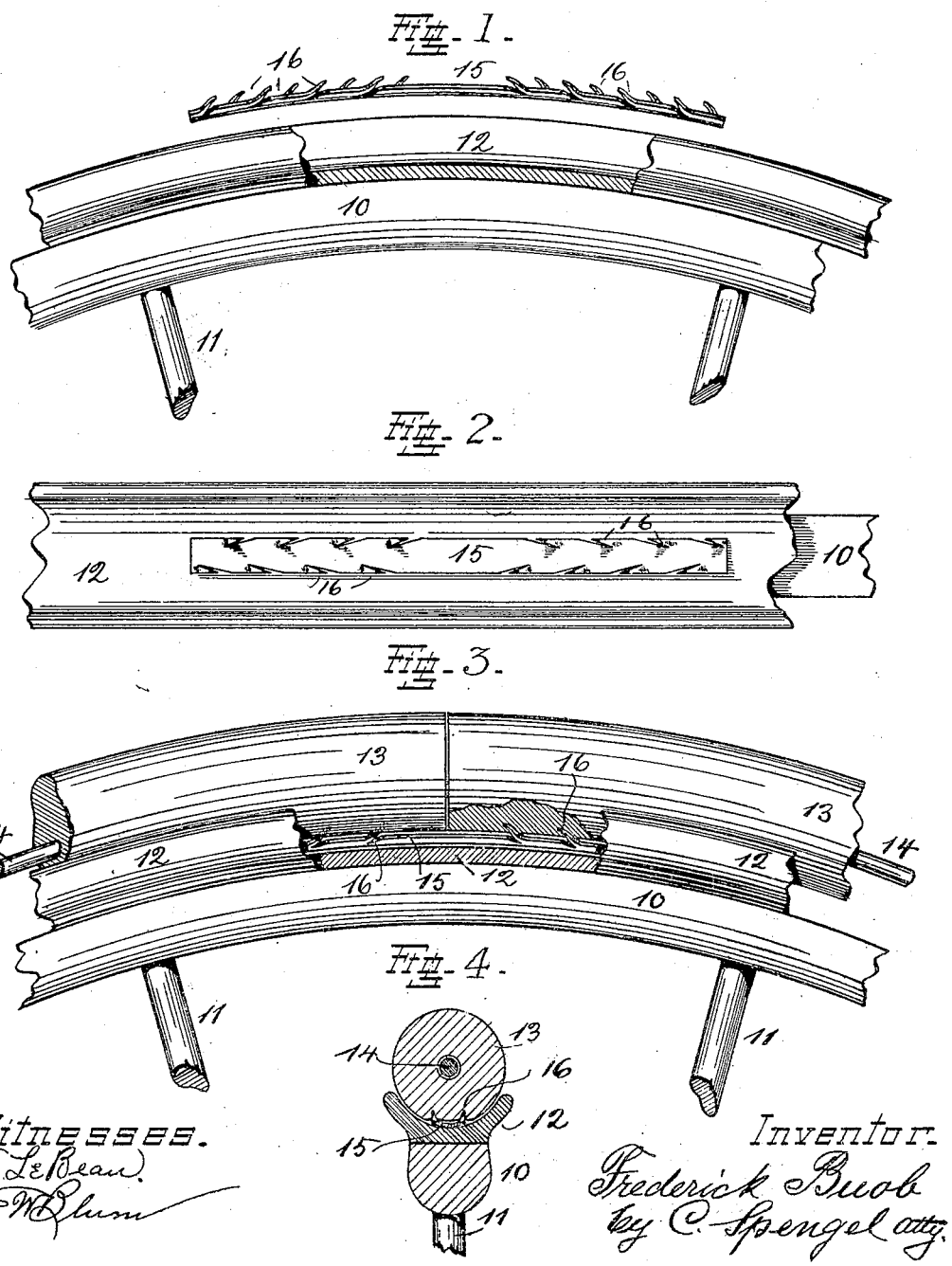

FREDERICK BUOB, OF CINCINNATI, OHIO.

JOINT-TIE FOR CUSHION-TIRES.

956,625.  Specification of Letters Patent.  Patented May 3, 1910.

Application filed March 30, 1908. Serial No. 424,020.

*To all whom it may concern:*

Be it known that I, FREDERICK BUOB, a citizen of the United States, and residing at Cincinnati, Hamilton county, State of Ohio, have invented certain new and useful Improvements in Joint-Ties for Cushion-Tires; and I do declare the following to be a clear, full, and exact description of the invention, attention being called to the accompanying drawing, with the reference characters marked thereon, which form also a part of this specification.

This invention relates to new and improved means for holding a cushion-tire closed at the joint where the ends of the material out of which it is formed and which is usually rubber, come together.

In the following specification and particularly pointed out in the claim at the end thereof, will be found a full description of my invention, together with its manner of use and construction, all of which is also illustrated in the accompanying drawing, in which:—

Figure 1 shows in side-view, with parts broken away, a portion of a wheel-rim before its tire is placed around it, together with the device which forms the subject of this invention, the same being shown above the wheel-rim and ready to be placed in position thereon. Fig. 2 is a top-view of the preceding figure with the device mentioned above placed in position on the face of the wheel-rim. Fig. 3, in a view similar to Fig. 1, shows the cushion-tire placed in position on the wheel-rim and the ends of the same joined by means of my device. Fig. 4 is a cross-section of this figure taken at a point near the joint of the tire.

In the drawing, 10 indicates the rim of the wheel and 11 indicates the spokes of the same. Around the face of the rim a channel 12 is provided for reception of the cushion-tire 13. The profile-shape of this channel corresponds to the profile-shape of the tire which it is to receive. These tires are length-wise perforated for reception of one or more tie-wires 14 the ends of which are connected to each other to form completely closed, circular ties whereby the cushion-tire is held in position within its channel. These wire-ties however do not keep the ends of the cushion material closely joined where they meet in the channel and additional means have to be resorted to, to keep the tire closed where its ends come together. Cement has been one of these means and metallic ties another. In addition to whatever means are used the tendency of the joint to open is usually counteracted before the joint is made by crowding cushion-material circumferentially onto the tie-wires in excess of the material required to merely fill the channel all around.

As an improved substitute, I provide a certain metallic tie 15 of appropriate length and width so as to be adapted to lie in the channel which receives the cushion and under this latter where its ends come together when the tire is formed and of limited thickness so as not to raise the tire out of its channel which would render its face uneven. These ties are placed in the channel before the ends of the cushion are brought together and in a position so that the longitudinal center of the ties is about where it is expected to bring these ends together to form the joint and below these ends. Fig. 1, shows this tie ready to be placed in position and Fig. 2, shows it so placed in the channel. Projections or barbs 16, more or less pointed, are provided on the upper surface of this tie which, when the tire comes down to its seat in the channel, embed themselves in the underside of the tire and thereby securely hold the ends of the same together. These barbs are inclined, those on one half of the tie, considering the same lengthwise, in opposite direction to those on the other half and with their elevated ends toward each other. This permits the ends of the tire to be brought readily together to form the joint without interference by these barbs which however engage the tire at once and prevent its ends from moving apart. These barbs are formed by slitting the longitudinal edges of the tie at alternate points, the cuts being arranged at an angle to these edges as best shown in Fig. 2, and by raising the outer part of the separated metal next to the edge of the tie above the plane of the tie as shown in Figs. 1, 3 and 4. The cuts are of course accordingly located and directed as most clearly apparent in Fig. 2, so that the separated metal when raised up, points in the proper direction. Ties intended for use on tires shown in Fig. 4, should be slightly curved transversely to conform the shape of the channel. This tie by reason of the two rows of barbs, one row at each of its longitudinal edges, holds the tire-ends effectually in position to form and to maintain the joint of the tire intact. Its construction is such that it may be cheaply manufactured.

Having described my invention, I claim as new:

A tie for cushion-tires, consisting of an elongated, flat piece of metal provided with projections which are formed by cutting the metal on opposite edges and at alternate points inwardly and at an acute angle to said edges and by bending part of the separated metal upwardly.

In testimony whereof, I hereunto affix my signature in the presence of two witnesses.

FREDERICK BUOB.

Witnesses:
C. SPENGEL,
T. LE BEAU.